US012263688B2

(12) United States Patent
Matsunaga

(10) Patent No.: US 12,263,688 B2
(45) Date of Patent: Apr. 1, 2025

(54) RECORDING DEVICE AND RECORDING METHOD

(71) Applicant: SEIKO EPSON CORPORATION, Tokyo (JP)

(72) Inventor: Hirotaka Matsunaga, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 258 days.

(21) Appl. No.: 18/164,650

(22) Filed: Feb. 6, 2023

(65) Prior Publication Data

US 2023/0249484 A1 Aug. 10, 2023

(30) Foreign Application Priority Data

Feb. 8, 2022 (JP) ................................ 2022-017718

(51) Int. Cl.
*B41J 25/00* (2006.01)
*B41J 29/393* (2006.01)

(52) U.S. Cl.
CPC ............ *B41J 25/006* (2013.01); *B41J 29/393* (2013.01)

(58) Field of Classification Search
CPC ..... B41J 11/42; B41J 29/38; B41J 2/01; B41J 25/00; B41N 3/00; G11B 7/08
See application file for complete search history.

(56) References Cited

U.S. PATENT DOCUMENTS 6,527,359 B1 * 3/2003 Otsuki ................... B41J 19/145 347/19
7,562,975 B2 * 7/2009 Yokoyama ............. B41J 11/007 347/85
7,828,400 B2 * 11/2010 Ikegame ................ B41J 29/393 347/42
9,815,301 B2 * 11/2017 Maesaka .............. B41J 11/0045
9,847,792 B2 * 12/2017 Miyadera ............ H03M 7/4093
9,975,364 B2 * 5/2018 Vicente Vicente .... B41J 29/393
11,260,673 B2 * 3/2022 Aoyagi .................. B41J 3/4071
2006/0031862 A1 * 2/2006 Naito ...................... H04N 1/121 720/658
2006/0112845 A1 * 6/2006 Ouchi .................. B41J 11/0065 101/467
2010/0134552 A1 6/2010 Suzuki et al.

FOREIGN PATENT DOCUMENTS

JP 2006-240055 A 9/2006
JP 2010-155723 A 7/2010

* cited by examiner

*Primary Examiner* — John Zimmermann
(74) *Attorney, Agent, or Firm* — Global IP Counselors, LLP

(57) ABSTRACT

A recording device includes a recording head, a carriage performing a reciprocating movement, a transport unit transporting the medium, and a control unit, wherein the control unit can perform a forward pass for causing the recording head to discharge the liquid along with a forward movement from one side to another side, and a return pass for causing the recording head to discharge the liquid along with a return movement from the other side to the one side, and performs first recording control when recording an image, in which when a feed amount on the one side of the medium is less than a feed amount on the other side, the image is recorded by the forward pass, and when the feed amount on the other side of the medium is less than the feed amount on the one side, the image is recorded by the return pass.

7 Claims, 8 Drawing Sheets

RECORDING DEVICE AND RECORDING METHOD

The present application is based on, and claims priority from JP Application Serial Number 2022-017718, filed Feb. 8, 2022, the disclosure of which is hereby incorporated by reference herein in its entirety.

BACKGROUND

1. Technical Field

The present disclosure relates to a recording device and a recording method.

2. Related Art

A recording sheet transport device for a serial type image recording device using a recording head mounted at a carriage has been disclosed (see JP 2006-240055 A). According to JP 2006-240055 A, an eccentric adjustment pattern is recorded by a recording device, and density of the eccentric adjustment pattern is read by a density detector, and thus distribution of transport errors in one rotation of a transport roller is detected, a correction value for correcting the transport error is calculated, and driving of the transport roller is controlled so as to correct the transport error based on the correction value.

Transport errors of a medium due to eccentricity of the transport roller, variations in nip force of the transport roller, and the like cause a reduction in quality of recording results on the medium. Therefore, there is a demand for a devise for preventing a reduction in recording quality due to transport errors in a simple process.

SUMMARY

A recording device includes a recording head including a nozzle row in which a plurality of nozzles for discharging liquid onto a medium are aligned, a carriage mounted with the recording head, and configured to perform a reciprocating movement along a main scanning direction, a transport unit configured to transport the medium in a transport direction intersecting the main scanning direction, and a control unit configured to control the recording head, the carriage, and the transport unit, wherein the control unit is configured to perform a forward pass of the carriage for causing the recording head to discharge the liquid along with a forward movement being a movement from one side to another side in the main scanning direction, and a return pass for causing the recording head to discharge the liquid along with a return movement being a movement from the other side to the one side by the carriage, and performs first recording control when the liquid is discharged onto the medium to record an image based on image data, in which when a feed amount on the one side of the medium in accordance with the transport is less than a feed amount on the other side of the medium, the image is recorded by the forward pass, and when the feed amount on the other side of the medium in accordance with the transport is less than the feed amount on the one side of the medium, the image is recorded by the return pass.

A recording method by a recording device including a recording head including a nozzle row in which a plurality of nozzles for discharging liquid onto a medium are aligned, a carriage mounted with the recording head, and performing a reciprocating movement along a main scanning direction, and a transport unit transporting the medium in a transport direction intersecting the main scanning direction, the recording device being configured to perform a forward pass of the carriage for causing the recording head to discharge the liquid along with a forward movement being a movement from one side to another side in the main scanning direction, and a return pass for causing the recording head to discharge the liquid along with a return movement being a movement from the other side to the one side by the carriage, the recording method including a recording step for discharging the liquid onto the medium to record an image based on image data, wherein in the recording step, when a feed amount on the one side of the medium in accordance with the transport is less than a feed amount on the other side of the medium, the image is recorded by the forward pass, and when the feed amount on the other side of the medium in accordance with the transport is less than the feed amount on the one side of the medium, the image is recorded by the return pass.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes and light and shade may not be precise, match each other, or some may be omitted.

1. OVERALL DESCRIPTION OF DEVICE CONFIGURATION

Figure 1:
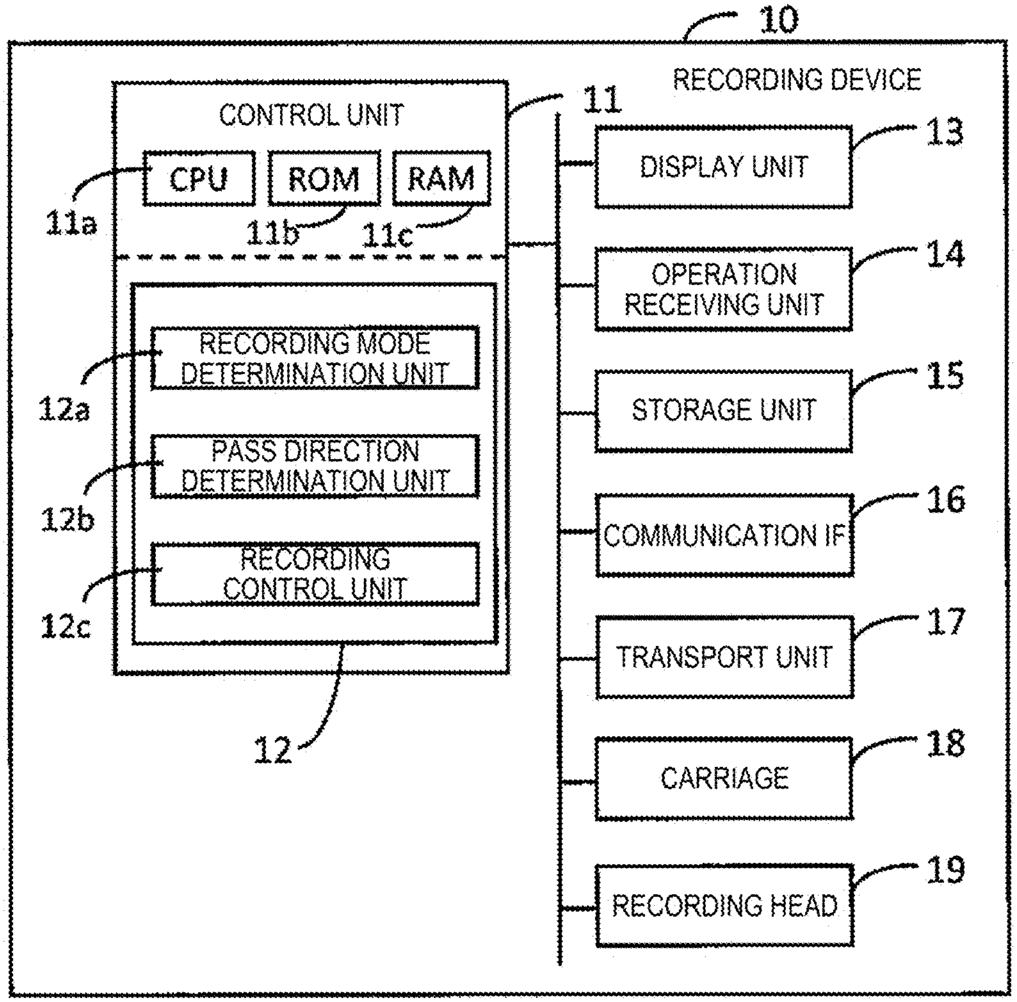
FIG. 1 is a block diagram illustrating a device configuration of the present exemplary embodiment in a simplified manner.

FIG. 1 illustrates a configuration of a recording device 10 according to the present exemplary embodiment, in a simplified manner. The recording device 10 performs a recording method of the present exemplary embodiment.

The recording device 10 is provided with a control unit 11, a display unit 13, an operation receiving unit 14, a storage unit 15, a communication IF 16, a transport unit 17, a carriage 18, a recording head 19, and the like. IF is an abbreviation for interface. The control unit 11 is configured to include, as a processor, one or more ICs including a CPU 11*a*, a ROM 11*b*, a RAM 11*c*, and the like, another non-volatile memory, and the like.

In the control unit 11, the processor, that is, the CPU 11*a* performs arithmetic processing in accordance with a program 12 stored in the ROM 11*b*, the other memory, or the like, using the RAM 11*c* or the like as a work area, to realize various functions such as a recording mode determination unit 12*a*, a pass direction determination unit 12*b*, a recording control unit 12*c*, and the like. The processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display, and a drive circuit for driving the display. The operation receiving unit 14 is a device for receiving input by a user, and is realized, for example, by a physical button, a touch panel, a mouse, a keyboard, or the like. Of course, the touch panel may be realized as a function of the display unit 13. The display unit 13 and the operation receiving unit 14 may be referred to as an operation panel of the recording device 10. The display unit 13 and the operation receiving unit 14 may be a part of the configuration of the recording device 10, or may be peripheral devices externally coupled to the recording device 10.

The storage unit 15 is, for example, a hard disk drive, a solid state drive, or a storage device by other memory. A part of the memory included in the control unit 11 may be understood as the storage unit 15. The storage unit 15 may be understood as a part of the control unit 11.

The communication IF 16 is a generic term for one or a plurality of IFs for communicating by the recording device 10 with an external device in a wired or wireless manner, in accordance with a prescribed communication protocol including a known communication standard. The external device is, for example, a communication device such as a personal computer, a server, a smart phone, or a tablet terminal.

The transport unit 17 is a device for transporting a medium 30 along a predetermined transport direction under control of the control unit 11. The transport unit 17 includes, for example, a roller that rotates to transport the medium 30, a motor as a power source for rotation, and the like.

Furthermore, the transport unit 17 may be a mechanism in which the medium 30 is mounted on a belt or a pallet moving by a motor, and the medium 30 is transported. The medium 30 is, for example, paper, but it is sufficient that the medium 30 is a medium that can be used as a recording target, and may be a material other than paper such as film or fabric.

The carriage 18 is a moving device that reciprocates along a predetermined main scanning direction by power of a carriage motor (not illustrated) under the control of the control unit 11. The main scanning direction and the transport direction intersect each other. Additionally, the carriage 18 is mounted with the recording head 19.

The recording head 19 is a device for discharging liquid onto the medium 30 by ink-jet method to perform a recording under the control of the control unit 11. Although the liquid is mainly ink, the recording head 19 is also capable of discharging liquid other than the ink. The carriage 18 and the recording head 19 may be collectively referred to as a recording unit.

A configuration of the recording device 10 may be realized by a single printer, or may be realized by a system including a plurality of communicatively coupled devices. For example, the recording device 10 may be a system including an information processing device responsible for the functions of the control unit 11, and a printer that includes the transport unit 17, the carriage 18, and the recording head 19, and performs a recording under control of the information processing device. In this case, the information processing device can be understood as a recording control device, an image processing device, or the like.

Figure 2:
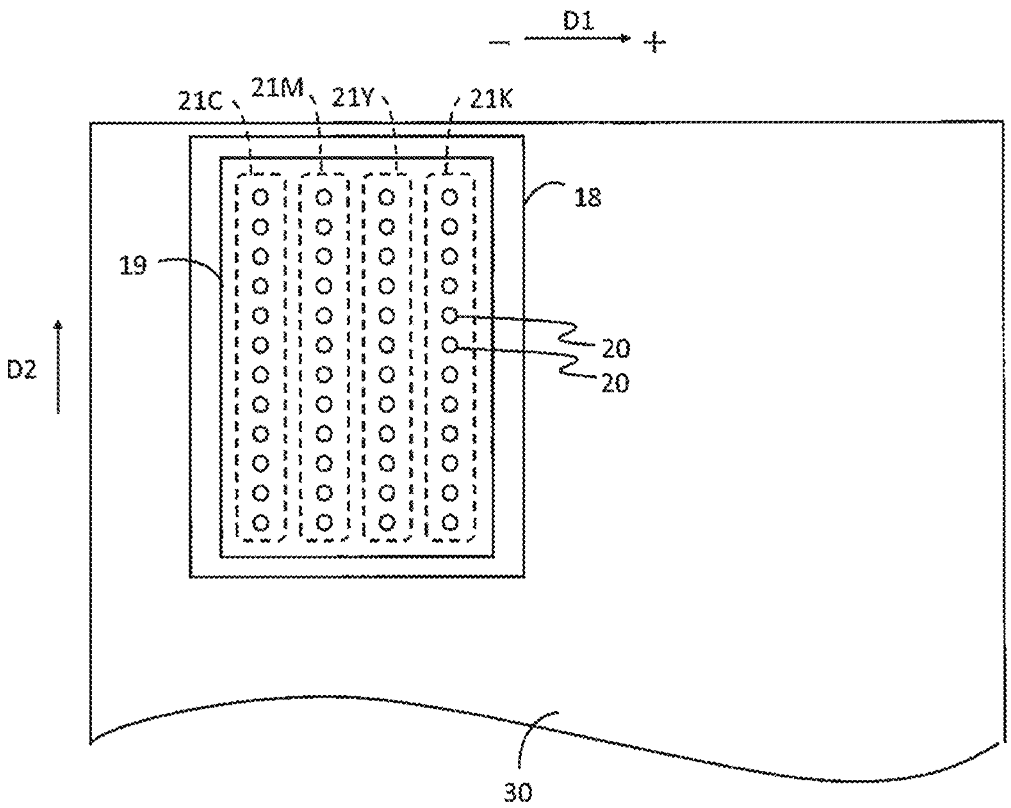
FIG. 2 is a diagram illustrating a relationship between a medium, a recording head, and the like, as seen from above, in a simplified manner.

FIG. 2 illustrates a relationship between the medium 30, the recording head 19, and the like in a simplified manner, as seen from above. The recording head 19 is mounted at the carriage 18, and can perform a forward movement and a return movement together with the carriage 18 along a main scanning direction D1. For convenience, a negative side in the main scanning direction D1 is referred to as a "one side" in the main scanning direction, and a positive side as an "another side" in the main scanning direction D1. Further, a movement of the carriage 18 from the one side to the other side in the main scanning direction D1 is called a "forward movement", and a movement of the carriage 18 from the other side to one side is called a "return movement". When referring to FIG. 2, and FIGS. 3A, 3B, 3C, FIG. 5, FIGS. 6A, 6B, and FIG. 8 described later, it may be understood that the one side is a left side, the other side is a right side, the forward movement is from left to right, and the return movement is from right to left.

The recording head 19 includes a plurality of nozzles 20 for discharging liquid such as ink. Each of white circles illustrated in FIG. 2 is the individual nozzle 20. A droplet discharged from the nozzle 20 is referred to as a dot. The recording head 19 has a nozzle row per type of liquid. The recording head 19 is capable of discharging a plurality of colors of ink, such as cyan (C), magenta (M), yellow (Y), black (K), for example. The recording head 19 may be referred to as a liquid discharging head, a printing head, a typing head, an ink jet head, or the like.

In FIG. 2, four nozzle rows 21C, 21M, 21Y, and 21K are very simply described. A nozzle row corresponding to ink of one color is configured by the plurality of nozzles 20 for which a nozzle pitch, which is an interval between the nozzles 20 in a transport direction D2, is constant or substantially constant. The main scanning direction D1 and the transport direction D2 are orthogonal or substantially orthogonal to each other. The nozzle row 21C is a nozzle row including a plurality of the nozzles 20 that discharge a C ink. Similarly, the nozzle row 21M is a nozzle row including a plurality of the nozzles 20 that discharge an M ink, the nozzle row 21Y is a nozzle row including a plurality of the nozzles 20 that discharge a Y ink, and the nozzle row 21K is a nozzle row including a plurality of the nozzles 20 that discharge a K ink. The recording head 19 may have a nozzle row corresponding to ink of a color other than CMYK, or to a predetermined liquid.

In FIG. 2, a nozzle alignment direction in which the plurality of nozzles 20 constituting the same nozzle row are aligned is parallel with the transport direction D2, but depending on a configuration of the recording head 19, the nozzle alignment direction may obliquely intersect the transport direction D2. The transport unit 17 transports the medium 30 from upstream to downstream in the transport direction D2. Upstream and downstream in the transport direction D2 are simply referred to as upstream and downstream. A plurality of the nozzle rows such as the nozzle rows 21C, 21M, 21Y, and 21K included in the recording head 19 are aligned along the main scanning direction D1, and the positions thereof are identical in the transport direction D2.

The control unit 11 causes the recording head 19 to discharge ink onto the medium 30 based on image data representing an image. As is known, in the recording head 19, a drive element is provided for each nozzle 20, and application of a drive signal to the drive element of each nozzle 20 in accordance with image data is controlled, so that the image represented by the image data is recorded on the medium 30 by each nozzle 20 discharging a dot or not discharging a dot.

The liquid discharging by the recording head 19 along with the movement of the carriage 18 is referred to as a "pass" or a "scan". A pass by the forward movement of the carriage 18 is called a "forward pass", and a pass by the return movement of the carriage 18 is called a "return pass". A recording performed in both the forward pass and the return pass is a bi-directional recording, and a recording by only one of the forward pass and the return pass is a single directional recording. In the single directional recording, either the forward movement or the return movement of the carriage 18 is merely a movement without liquid discharging by the recording head 19.

The control unit 11 combines such passes by the carriage 18 and the recording head 19, and a so-called paper feed, which is transport by a predetermined distance of the medium 30 by the transport unit 17, to record the image represented by the image data on the medium 30. Of the image represented by the image data, a unit recorded in one pass is referred to as a "band". Also, a length in the transport direction D2 of a band is referred to as a "band width". The control unit 11, in general, can reproduce an image formed from a plurality of bands on the medium 30, by repeating a recording of the band and a paper feed by a distance corresponding to a band width.

Here, banding will be simply described.

Even when the transport unit 17 performs a paper feed by a predetermined band width under the control of the control unit 11, a distance by which the medium 30 is actually fed may be slightly longer or conversely shorter, due to operation errors, manufacturing errors, and the like of various components including a roller constituting the transport unit 17. That is, a transport error may occur. When a feed amount by one paper feed is longer than the predetermined band width, a gap may occur between a band recorded earlier and a band recorded later on the medium 30, and a "white line" may be visually recognized. On the other hand, when a feed amount by one paper feed is shorter than the predetermined band width, a band recorded earlier and a band recorded later on the medium 30 partially overlap, and a "black line" may be visually recognized. The white line is line-shaped unevenness that appears lighter than a surrounding color, and does not necessarily need to be white. Further, the black line is line-shaped unevenness that appears darker than the surrounding color, and does not necessarily need to be black. Such line-shaped unevenness that may occur at a boundary portion between bands is also generally referred to as "banding". Note that, in order to reduce an effect of the banding, there is a case where a band recorded earlier and a band recorded later on the medium 30 are partially overlaid and recorded, but in such a case the banding similarly may occur.

Additionally, the medium 30 being transported may be inclined with respect to the transport direction D2 due to a transport error caused by eccentricity of a roller included in the transport unit 17, variations of nip force of the medium 30 by a roller, or the like. This inclination is also referred to as a "skew". That is, a feed amount by one paper feed is different between the one side and the other side in the main scanning direction D1, and thus a skew occurs in the medium 30. Due to such a skew, both white and black lines may occur between a band recorded earlier and a band recorded later on the medium 30.

2. RELATIONSHIP BETWEEN CARRIAGE VELOCITY AND BAND WIDTH

Next, a phenomenon in which a band width recorded on the medium 30 is changed in accordance with velocity of the carriage 18 will be described.

Figure 3A:
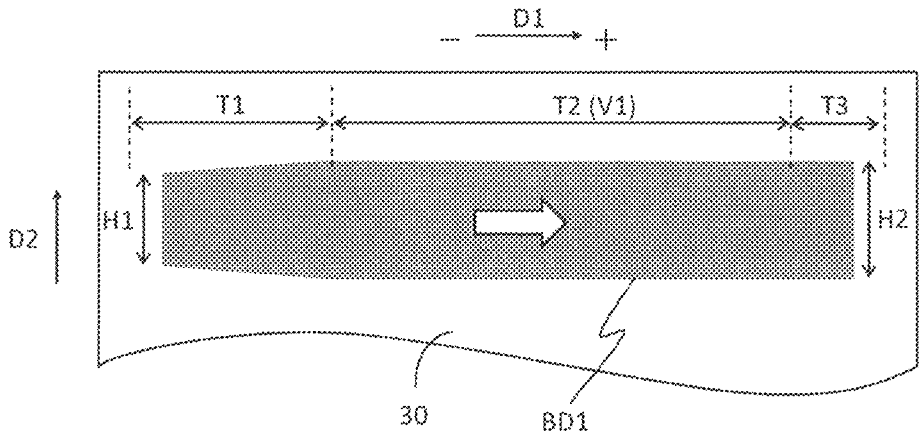
FIG. 3A, FIG. 3B, and FIG. 3C are diagrams each explaining a relationship between carriage velocity and a band width.

FIG. 3A is a diagram for explaining a relationship between the velocity of the carriage 18 and the band width. FIG. 3A illustrates a portion of the medium 30, and a band BD1 recorded on the medium 30 by one pass. In each figure, a white arrow in the band indicates a direction of the pass, and according to FIG. 3A, the band BD1 is an image recorded by one forward pass. Code T1, T2, and T3 indicate an acceleration interval T1, a constant velocity interval T2, and a deceleration interval T3, respectively, of the carriage 18 when the pass is performed. That is, velocity of the carriage 18 accelerates to predetermined velocity V1 from a state of velocity 0, decelerates through the constant velocity V1, and again reaches the velocity 0, in one pass. Since FIG. 3A is an example of the forward pass, the acceleration interval T1, the constant velocity interval T2, and the deceleration interval T3 are aligned in order from the one side to the other side in the main scanning direction D1, but the acceleration interval T1, the constant velocity interval T2, and the deceleration interval T3 are aligned in order from the other side to the one side in the main scanning direction D1 in an example of the return pass.

Figure 3B:
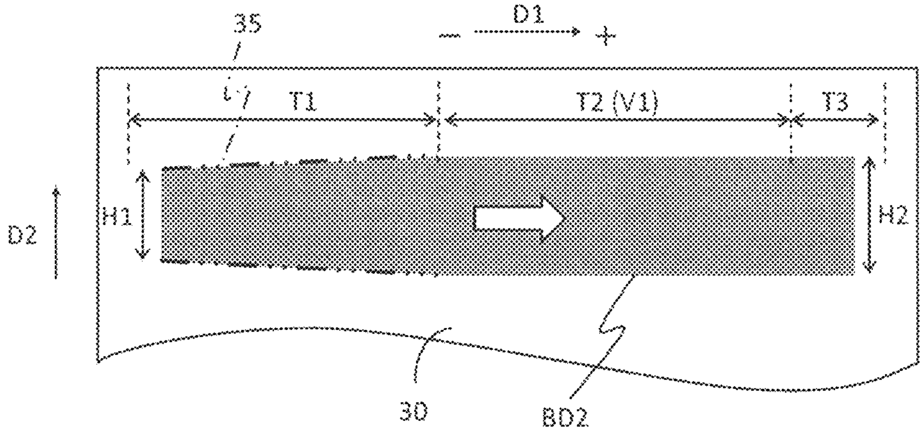
Figure 3C:
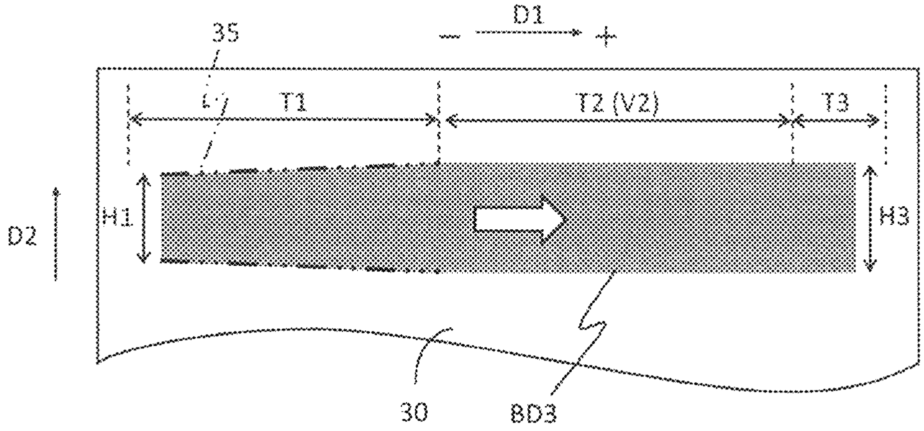

While the carriage 18 is moving, dots discharged from the nozzles 20 of the nozzle row of the recording head 19 are influenced by an airflow and spread and fly in a longitudinal direction of the nozzle row, that is, upstream and downstream in the transport direction D2, and land on the medium 30. Also, a degree of the spread increases as the velocity of the carriage 18 increases. As such, as illustrated in FIG. 3A, a band width of the band BD1 recorded in the forward pass is H1 at the time when the acceleration from the one side to the other side in the main scanning direction D1 is just started, is gradually increased from H1 in the acceleration interval T1, and is H2 in the constant velocity interval T2 at the velocity V1. That is, the band width H1<the band width H2. Note that, in the deceleration interval T3 after the constant velocity interval T2, there is no particularly noticeable change in the band width, due to inertia. Similar to FIG. 3A, each of FIG. 3B and FIG. 3C is a diagram for explaining the relationship between the velocity of the carriage 18 and the band width. In FIGS. 3A, 3B, and 3C, prioritizing ease of understanding, a state is clearly illustrated where the band width changes according to the velocity of the carriage 18. FIGS. 3B and 3C will be described later.

In this way, even when a band width of a band recorded in one pass is constant in image data of a recording source, the band width is not constant as a recording result, and a band width on a side, of the one side and the other side of the main scanning direction D1, where a pass starts is less than a band width on a side where the pass ends. In the present exemplary embodiment, when an image is recorded on the medium 30 based on image data, the control unit 11 performs "first recording control" utilizing a phenomenon where a band width is not constant as described above, in order to suppress banding that easily occurs due to a skew. The first recording control is processing in which an image is recorded by a forward pass when a feed amount on the one side in the main scanning direction D1 of the medium 30 according to transport is less than a feed amount on the other side, and the image is recorded by a return pass when the feed amount on the other side in the main scanning direction D1 of the medium 30 in accordance with the transport is less than the feed amount on the one side.

3. HOW TO ACQUIRE SKEW INFORMATION

The fact that the feed amount on the one side in the main scanning direction D1 of the medium 30 in accordance with the transport is less than the feed amount on the other side means that the medium 30 is skew toward the one side. On the other side, the fact that the feed amount on the other side in the main scanning direction D1 of the medium 30 in accordance with the transport is less than the feed amount on the one side means that the medium 30 is skew toward the one side. In order to perform the first recording control, the control unit 11 needs to recognize how the medium 30 is skew in the recording device 10.

Figure 4:
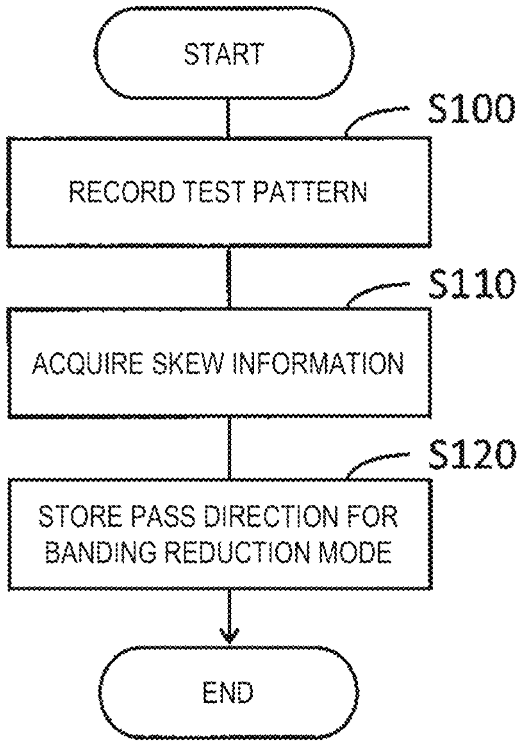
FIG. 4 is a flowchart illustrating skew information acquisition processing.

FIG. 4 illustrates, by a flowchart, skew information acquisition processing performed by the control unit 11 in accordance with the program 12.

In step S100, the recording control unit 12*c* of the control unit 11 controls the carriage 18, the recording head 19, and the transport unit 17 to record a test pattern 40 on the medium 30 by a plurality of passes. Test pattern image data, which is image data representing the test pattern 40, is stored in the storage unit 15 in advance, and the recording control unit 12*c* records the test pattern 40 on the medium 30 by causing the recording head 19 to discharge ink based on the test pattern image data.

Figure 5:
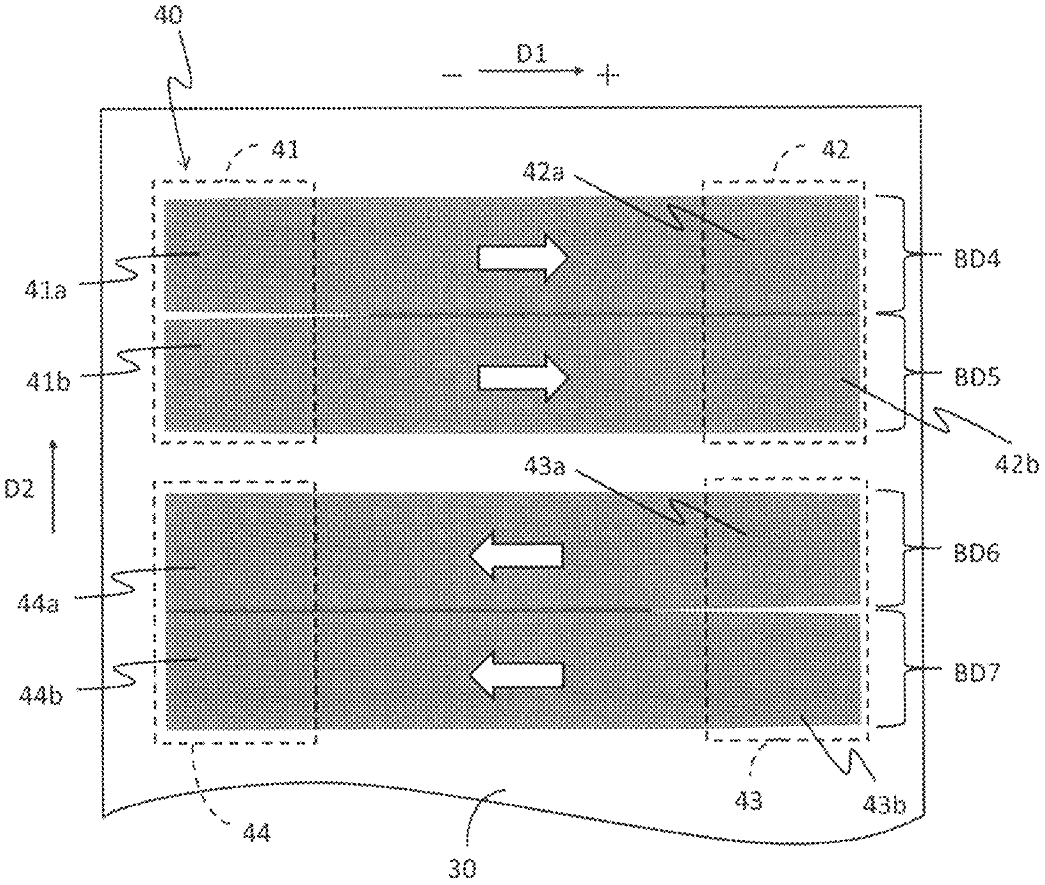
FIG. 5 is a diagram illustrating an example of a test pattern recorded in step S100.

FIG. 5 illustrates an example of the test pattern 40 recorded on the medium 30 in step S100. The test pattern 40 is schematically constituted by four bands BD4, BD5, BD6, and BD7. A color of the bands BD4, BD5, BD6, and BD7 is not particularly limited. For example, the bands BD4, BD5, BD6, and BD7 are all gray-colored solid images.

The band BD4 is a band recorded by a first forward pass. The band BD5 adjacent upstream the band BD4 is a band recorded by a second forward pass, after the first forward pass, through a paper feed by a predetermined band width of the medium 30 by the transport unit 17. Furthermore, the band BD6 at a position spaced upstream from the band BD5 is a band recorded by a first return pass. The band BD7 adjacent upstream the band BD6 is a band recorded by a second return pass, after the first return pass, through a paper feed by the predetermined band width of the medium 30 by the transport unit 17. Note that, a positional relationship between a pair of the bands BD4 and BD5, and a pair of the bands BD6 and BD7 may be reversed from the example in the figure. That is, the pair of bands BD6 and BD7 may be recorded downstream from the pair of bands BD4 and BD5.

As surrounded by a dashed line in FIG. 5, a "first pattern 41*a*", which is a region on the one side in the main scanning direction D1 of the band BD4, and a "third pattern 41*b*", which is a region on the one side in the main scanning direction D1 of the band BD5 are collectively referred to as a "forward pass start side pattern 41".

Additionally, a "second pattern 42*a*", which is a region on the other side in the main scanning direction D1 of the band BD4, and a "fourth pattern 42*b*", which is a region on the other side in the main scanning direction D1 of the band BD5, surrounded by a dashed line, are collectively referred to as a "forward pass end side pattern 42".

Similarly, a "fifth pattern 43*a*", which is a region on the other side in the main scanning direction D1 of the band BD6, and a "seventh pattern 43*b*", which is a region on the other side in the main scanning direction D1 of the band BD7, surrounded by a dashed line, are collectively referred to as a "return pass start side pattern 43".

Additionally, a "sixth pattern 44*a*", which is a region on the one side in the main scanning direction D1 of the band BD6, and an "eighth pattern 44*b*", which is a region on the one side in the main scanning direction D1 of the band BD7, surrounded by a dashed line, are collectively referred to as a "return pass end side pattern 44".

In the example in FIG. 5, white lines at a similar level occur at a boundary portion between the first pattern 41*a* and the third pattern 41*b* of the forward pass start side pattern 41, and a boundary portion between the fifth pattern 43*a* and the seventh pattern 43*b* of the return pass start side pattern 43, respectively. In addition, black lines at a similar level occur at a boundary portion between the second pattern 42*a* and the fourth pattern 42*b* of the forward pass end side pattern 42, and a boundary portion between the sixth pattern 44*a* and the eighth pattern 44*b* of the return pass end side pattern 44, respectively. The term "similar level" used here means that density or thickness is at a similar level. As described in FIG. 3A, due to the fact that the band width on the start side of the pass is less than that on the end side of the pass, the white line is likely to occur in the forward pass start side pattern 41 or in the return pass start side pattern 43. As illustrated in FIG. 5, when the banding in the forward pass start side pattern 41 and the banding in the return pass start side pattern 43 are at the similar level, and the banding in the forward pass end side pattern 42 and the banding in the return pass end side pattern 44 are at the similar level, the case can be said to be a state where there is no or almost no difference between the feed amount on the one side in the main scanning direction D1 and the feed amount on the other side in the main scanning direction D1 by a paper feed, that is a state where the medium 30 is not skew. Note that, the state where the banding is at the similar level includes a state where there is little banding.

Figure 6A:
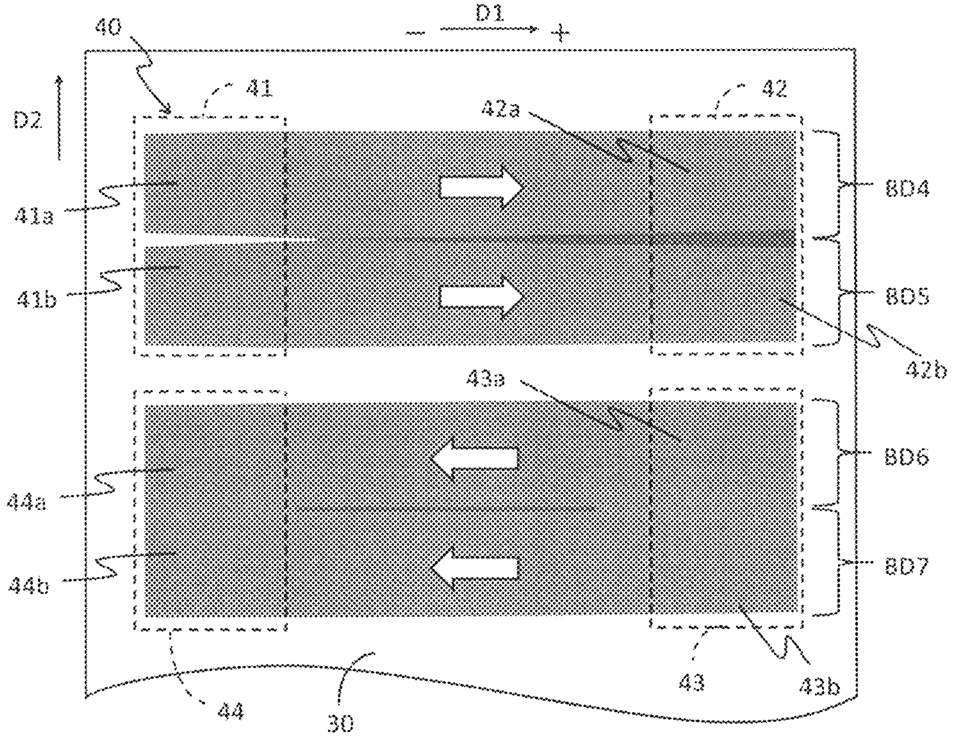
FIG. 6A and FIG. 6B are diagrams each illustrating an example of a test pattern recorded in step S100.
Figure 6B:
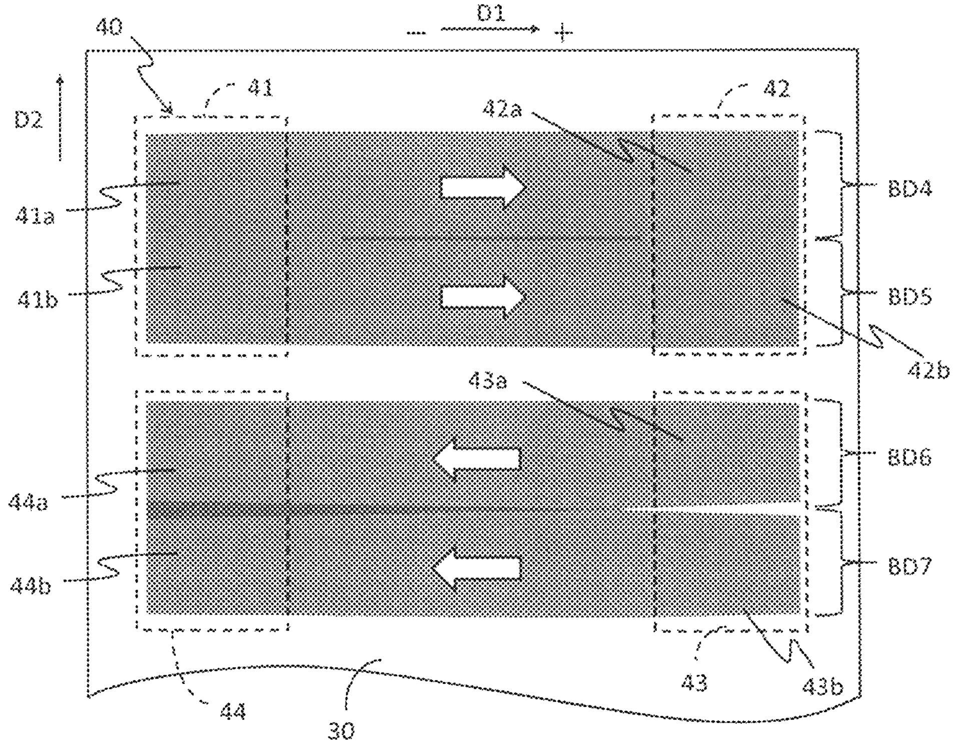

Each of FIG. 6A and FIG. 6B illustrates an example of the test pattern 40 recorded on the medium 30 in step S100. A way of looking at FIGS. 6A and 6B is the same as that of FIG. 5. Also in FIG. 5, FIGS. 6A and 6B, the banding such as the white lines and the black lines is more clearly represented than the banding actually is. Additionally, in FIG. 5, FIGS. 6A and 6B, each of the bands BD4, BD5, BD6, and BD7 is formed by continuously discharging ink along the main scanning direction D1, but a space between the forward pass start side pattern 41 and the forward pass end side pattern 42 may be a blank region not recorded with ink in view of the purpose of recording the test pattern 40. Similarly, a space between the return pass start side pattern 43 and the return pass end side pattern 44 may be a blank region not recorded with ink.

In the example of FIG. 6A, the white line is relatively clearly generated at the boundary portion between the first pattern 41*a* and the third pattern 41*b* of the forward pass start side pattern 41, but noticeable banding is not generated at the boundary portion between the fifth pattern 43*a* and the seventh pattern 43*b* of the return pass start side pattern 43. In addition, the black line is relatively clearly generated at the boundary portion between the second pattern 42*a* and the fourth pattern 42*b* of the forward pass end side pattern 42, but noticeable banding is not generated at the boundary portion between the sixth pattern 44*a* and the eighth pattern 44*b* of the return pass end side pattern 44. In this way, when the black line caused by overlapping of the bands is generated noticeably in the forward pass end side pattern 42 in which the band width of each of the bands BD4 and BD5 is large, and there is no noticeable banding in the return pass start side pattern 43 in which the band width of each of the bands BD6 and BD7 is small and the white line is easily generated, the case can be said to be a state where the feed amount on the other side in the main scanning direction D1 by a paper feed is less than the feed amount on the one side in the main scanning direction D1, that is, a state where the medium 30 is skew toward the other side.

On the other hand, in the example in FIG. 6B, no noticeable banding is generated at the boundary portion between the first pattern 41*a* and the third pattern 41*b* of the forward pass start side pattern 41, and the white line is relatively noticeably generated at the boundary portion between the fifth pattern 43*a* and the seventh pattern 43*b* of the return pass start side pattern 43. Further, no noticeable banding is generated at the boundary portion between the second pattern 42*a* and the fourth pattern 42*b* of the forward pass end side pattern 42, and the black line is relatively noticeably generated at the boundary portion between the sixth pattern 44*a* and the eighth pattern 44*b* of the return pass end side pattern 44. In this way, when there is no noticeable banding in the forward pass start side pattern 41 in which the band width of each of the bands BD4 and BD5 is small and the white line is easily generated, and the black line caused by overlapping of the bands is generated noticeably in the return pass end side pattern 44 in which the band width of each of the bands BD6 and BD7 is large, the case can be said to be a state where the feed amount on the one side in the main scanning direction D1 by the paper feed is less than the feed amount on the other side in the main scanning direction D1, that is, a state where the medium 30 is skew toward the one side.

The user visually evaluates the test pattern 40 recorded on the medium 30 in step S100, and determines a state of the skew in accordance with a degree or difference of the banding in each of the forward pass start side pattern 41, the forward pass end side pattern 42, the return pass start side pattern 43, and the return pass end side pattern 44. That is, when the recording result of the test pattern 40 as illustrated in FIG. 5 is obtained, it can be determined that there is no skew, when the recording result of the test pattern 40 as illustrated in FIG. 6A is obtained, it can be determined that there is a skew toward the other side in the main scanning direction D1, and when the recording result of the test pattern 40 as illustrated in FIG. 6B is obtained, it can be determined that there is a skew toward the one side in the main scanning direction D1.

In step S110, the control unit 11 acquires skew information. That is, by operating the operation receiving unit 14, the user inputs "skew information", such as there is no skew, there is a skew toward the one side in the main scanning direction D1, or there is a skew toward the other side in the main scanning direction D1, and the control unit 11 acquires the input skew information. The skew information corresponds to information representing a magnitude relationship between the feed amount on the one side in the main scanning direction D1 and the feed amount on the other side by the paper feed. Accordingly, it can be said that, in step S110, the control unit 11 acquires the information representing the magnitude relationship between the feed amount on the one side of the medium 30 and the feed amount on the other side, based on the recording result of the first pattern to the eighth pattern.

The acquisition of the skew information in step S110 is not limited to direct input by the user. For example, the user causes a scanner (not illustrated) to read the medium 30 on which the test pattern 40 is recorded. The scanner generates read image data as a reading result of the test pattern 40, and transfers the read image data to the recording device 10. In the recording device 10 that receives the read image data of the test pattern 40, the control unit 11 may analyze the read image data to determine the state of the skew in accordance with the degree or difference of the banding in each of the forward pass start side pattern 41, the forward pass end side pattern 42, the return pass start side pattern 43, and the return pass end side pattern 44, and may acquire skew information such as there is no skew, there is a skew toward the one side in the main scanning direction D1, or there is a skew toward the other side in the main scanning direction D1.

In step S120, the control unit 11 stores a pass direction for a "banding reduction mode" in the storage unit 15 in accordance with the skew information acquired in step S110, and terminates the flowchart of FIG. 4. The banding reduction mode is one of a plurality of recording modes that correspond to different recording quality included in the recording device 10, and is a recording mode for performing the first recording control. Furthermore, the banding reduction mode corresponds to a predetermined recording mode with relatively higher recording quality. When acquiring the skew information that there is a skew toward the one side in the main scanning direction D1, the control unit 11 stores the forward movement as a pass direction, that is, the forward pass. Further, when acquiring the skew information that there is a skew toward the other side in the main scanning direction D1, the return movement as the pass direction, that is, the return pass is stored.

Note that, when acquiring the skew information that there is no skew, the control unit 11 does not store a pass direction for the banding reduction mode in step S120. Alternatively, the control unit 11 may store setting that the banding reduction mode is not performed.

4. RECORDING CONTROL PROCESSING

Figure 7:
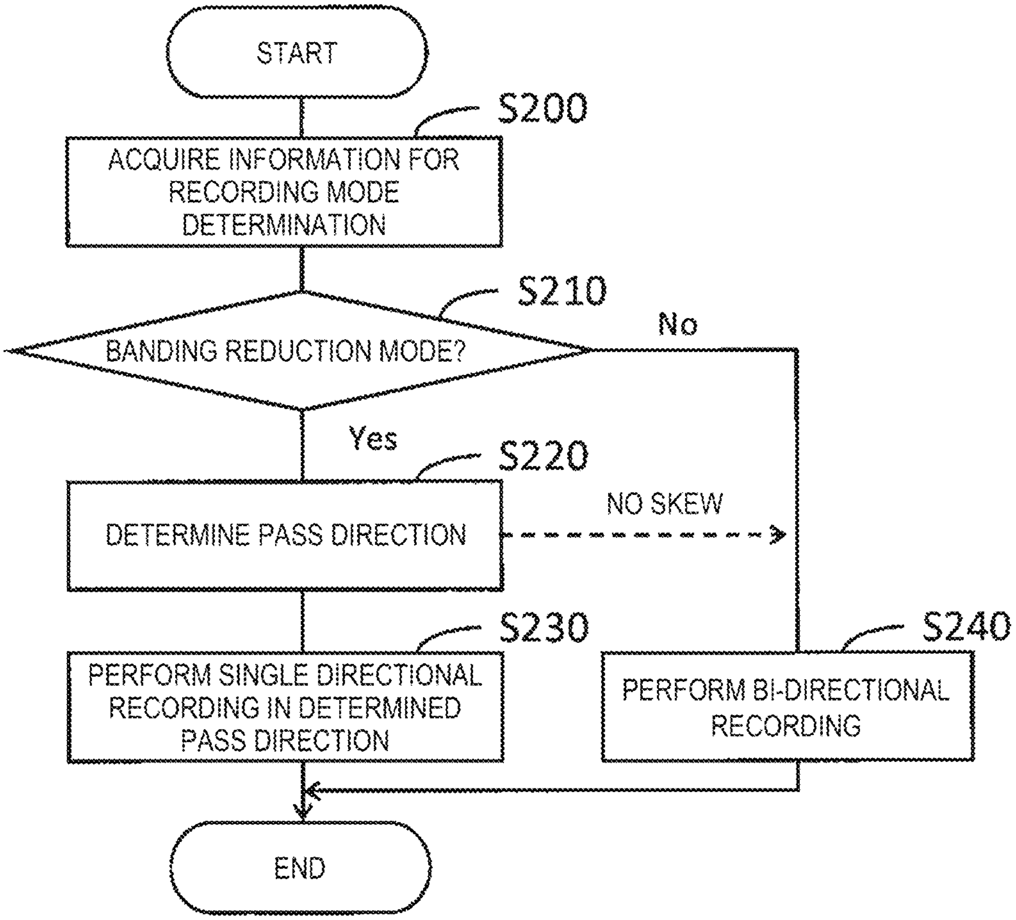
FIG. 7 is a flowchart illustrating recording control processing.

FIG. 7 illustrates, by a flowchart, recording control processing performed by the control unit 11 in accordance with the program 12. The flowchart represents a recording method according to the present exemplary embodiment.

When receiving a recording start instruction based on image data that is freely selected by the user, via the operation receiving unit 14, or via the communication IF 16 from an external device, the control unit 11 starts the flowchart of FIG. 7. The image data freely selected by the user is referred to below as "target image data" in a sense of image data to be recorded.

In step S200, the recording mode determination unit 12*a* of the control unit 11 acquires information for determining a recording mode to perform (hereinafter, recording mode determination information). The recording device 10 includes, as a recording mode, a "quick mode" or the like that prioritizes, for example, high velocity, in addition to the banding reduction mode. The quick mode is inferior to the banding reduction mode in terms of recording quality. Off course, the banding reduction mode may have a different name, for example, may be referred to as a "clean mode". In addition, among the recording modes in which the recording quality is prioritized, particularly, a predetermined recording mode, which is intended to reduce banding due to a skew of the medium 30, may be the banding reduction mode.

In any event, the user can select a recording mode from among the plurality of recording modes corresponding to the different recording quality, including the banding reduction mode, by operating the operation receiving unit 14. Then, the recording mode determination unit 12*a* receives this selection. The information indicating the recording mode selected by the user is recording mode determination information.

In step S210, the recording mode determination unit 12*a* determines whether to perform the banding reduction mode or not in accordance with the recording mode determination information acquired in step S200, and the processing proceeds to step S220 from determination of "Yes" when the banding reduction mode is to be performed. On the other hand, when a recording mode other than the banding reduction mode is to be performed, the processing proceeds to step S240 from determination of "No". In other words, the recording mode determination unit 12*a*, when the recording mode determination information indicates the banding reduction mode, determines "Yes" in step S210, and when the recording mode determination information indicates a recording mode other than the banding reduction mode, determines "No" in step S210.

In step S200, the recording mode determination information acquired by the recording mode determination unit 12*a* is not limited to the information of the recording mode selected by the user, and may be the target image data itself. The recording mode determination unit 12*a* analyzes a header and a body of the acquired target image data, and determines whether an image represented by the target image data is an image of a "first type" in which banding is more noticeable than a predetermined reference or not. The first type of image is an image that does not include a blank, or an image in which a ratio of blanks in an area of an entire image is less than a predetermined ratio, and is, in particular, a photograph, a portrait, or the like. On the other hand, a character image or the like does not correspond to the first type of image because a ratio of blanks in an image is high and banding is unlikely to be noticeable.

Then, in step S210, when the image represented by the target image data corresponds to the first type, the recording mode determination unit 12*a* may determine to perform the banding reduction mode, and may proceed from "Yes" to step S220. Further, when the image represented by the target image data does not correspond to the first type, the recording mode determination unit 12*a* may determine not to perform the banding reduction mode, and may proceed from "No" in step S210 to step S240.

Note that, in the configuration in which both the selection of the recording mode by the user, and the determination of whether the target image data corresponds to the first type of image or not are performed, either one may be prioritized. For example, when the banding reduction mode is selected by the user, the recording mode determination unit 12*a* may determine "Yes" in step S210 regardless of whether the target image data corresponds to the first type of image or not. Alternatively, when the banding reduction mode is selected by the user, and the target image data corresponds to the first type of image, "Yes" may be determined in step S210.

In step S220, the pass direction determination unit 12*b* determines a pass direction to employ in the banding reduction mode. By the skew information acquisition processing described above, the pass direction is stored in the storage unit 15, and thus it is sufficient that the pass direction determination unit 12*b* reads out the pass direction stored in the storage unit 15 and determines the pass direction accordingly. In other words, when the forward pass is stored as the pass direction, the forward pass is determined as the pass direction, and when the return pass is stored as the pass direction, and the return pass is determined as the pass direction.

In step S230, the recording control unit 12*c* performs a recording based on the target image data in a single directional recording in the pass direction determined in step S220. Of course, the recording control unit 12*c*, in order for the target image data to be image data in a format that the recording head 19 uses for ink jet type liquid discharging, performs resolution conversion processing, color conversion processing, halftone processing, pass decomposition processing, and the like, for the target image data as appropriate, and then starts a recording. When the forward pass is determined in step S220, the recording control unit 12*c* controls the carriage 18, the recording head 19, and the transport unit 17, and records, on the medium 30, the image represented by the target image data only in the plurality of forward passes, in step S230. Conversely, when the return pass is determined in step S220, the recording control unit 12*c* controls the carriage 18, the recording head 19, and the transport unit 17, and records, on the medium 30, the image represented by the target image data only in the plurality of return passes, in step S230. Such steps S220 and S230 are a recording according to the banding reduction mode, that is, the first recording control.

The forward pass is performed in step S230, because the medium 30 tends to be skew toward the one side in the main scanning direction D1 by a paper feed between a forward pass and the next forward pass, and thus, a suitable recording result with almost no banding generated, such as the bands BD4 and BD5 illustrated in FIG. 6B, can be obtained. In other words, because of the skew toward the one side in the main scanning direction D1, a portion on the one side of the band recorded earlier, and a portion of the one side of the band to be recorded next easily approach, and a portion of the other side of the band recorded earlier and a portion on the other side of the band to be recorded next are easily separated, but in any band, the band width is small on the one side, and the band width is large on the other side. As a result, partial overlapping or partial separation of bands is relaxed, and a recording result in which almost no black line or white line is generated is obtained.

Further, the return pass is performed in step S230, because the medium 30 tends to be skew toward the other side in the main scanning direction D1 by a paper feed between a return pass and the next return pass, and thus, a suitable recording result with almost no banding generated, such as the bands BD6 and BD7 illustrated in FIG. 6A, can be obtained. In other words, because of the skew toward the other side in the main scanning direction D1, a portion on the other side of the band recorded earlier, and a portion of the other side of the band to be recorded next easily approach, and a portion of the one side of the band recorded earlier and a portion on the one side of the band to be recorded next are easily separated, but in any band, the band width is small on the other side, and the band width is large on the one side. As a result, partial overlapping or partial separation of bands is relaxed, and a recording result in which almost no black line or white line is generated is obtained.

Note that, when the pass direction for the banding reduction mode is not stored, or the setting that the banding reduction mode is not performed is stored in the storage unit 15, the medium 30 is not skew, and thus the effect of the first recording control is not obtained. Therefore, when the pass direction for the banding reduction mode is not stored, or the setting that the banding reduction mode is not performed is stored in the storage unit 15, it is sufficient that the pass direction determination unit 12*b* proceeds from step S220 to step S240 as indicated by a dashed arrow in FIG. 7.

In step S240, the recording control unit 12*c* performs a recording based on the target image data in the bi-directional recording. In other words, the carriage 18, the recording head 19, and the transport unit 17 are controlled to record the image represented by the target image data on the medium 30 by the forward pass and the return pass. Step S240 corresponds to a recording mode other than the banding reduction mode. In FIG. 7, the recording modes other than the banding reduction mode are collectively described as one in step S240, but various settings may be varied depending on the recording mode even in the bi-directional printing. For example, in the bi-directional recording, in addition to a mode that simply records one band in one pass, a mode that employs a so-called overlap recording that records an area corresponding to one band in a plurality of passes, or the like, may be used.

Through such a step S230 or step S240, the flowchart of FIG. 7 is terminated.

5. SUMMARY

In this manner, according to the present exemplary embodiment, the recording device 10 includes the recording head 19 including the nozzle row in which the plurality of nozzles 20 configured to discharge liquid onto the medium 30 are aligned, and the carriage 18 mounted with the recording head 19, and configured to reciprocate along the main scanning direction D1, the transport unit 17 configured to transport the medium 30 in the transport direction D2 intersecting the main scanning direction D1, and the control unit 11 configured to control the recording head 19, the carriage 18, and the transport unit 17. The control unit 11 can perform the forward pass for causing the recording head 19 to discharge liquid along with the forward movement, which is the movement from the one side to the other side in the main scanning direction D1 by the carriage 18, and the return pass for causing the recording head 19 to discharge the liquid along with the return movement, which is the movement from the other side to the one side by the carriage 18. Then, the control unit 11 performs the first recording control in which when an image is recorded by discharging the liquid onto the medium 30 based on image data, and a feed amount on the one side of the medium 30 in accordance with the transport is less than a feed amount on the other side of the medium 30, the image is recorded by the forward pass, and when the feed amount on the other side of the medium 30 in accordance with the transport is less than the feed amount on the one side of the medium 30, the image is recorded by the return pass.

According to the configuration described above, when the feed amount on the one side in the main scanning direction D1 is less than the feed amount on the other side due to a transport error by the transport unit 17, or conversely, when the feed amount on the other side in the main scanning direction D1 is less than the feed amount on the one side, and a skew of the medium 30 is generated, the recording device 10 performs the single directional recording, using the side, of the one side and the other side in the main scanning direction D1, with the small feed amount as a start side. Accordingly, by utilizing a fact that a width of an image recorded in a pass is different between a start side and an end side of the pass, partial overlapping or separation of images recorded in the passes can be suppressed, and a reduction in recording quality due to banding can be prevented as much as possible. In addition, no special device or complex correction operation is required, and a reduction in recording quality due to banding can be prevented in a simple process.

In addition, according to the present exemplary embodiment, the control unit 11 can accept a selection of a recording mode from among the plurality of recording modes corresponding to the different recording quality, and may perform the first recording control when a selection of a predetermined recording mode having relatively high recording quality among the plurality of recording modes is received.

According to the above configuration, the first recording control is performed, or is not performed according to the selection of the recording mode by the user. Therefore, when the first recording control is not required, a recording mode having more excellent recording velocity than the first recording control, or the like can be employed, to improve recording efficiency.

In addition, according to the present exemplary embodiment, the control unit 11 may perform the first recording control, when the image represented by the image data is the first type of image in which banding generated at a boundary portion between bands being units of recording by the forward pass or the return pass, is more noticeable than a predetermined reference.

According to the configuration described above, the first recording control is performed when the first type of image in which a reduction in recording quality due to banding is easily noticeable is recorded. Therefore, when recording an image other than the first type, a recording mode having excellent recording velocity as compared to the first recording control, or the like, can be used to improve recording efficiency.

In addition, according to the present exemplary embodiment, the control unit 11, by the first forward pass, records the first pattern 41*a* at the position on the one side of the medium 30 and records the second pattern 42*a* at the position on the other side of the medium 30, causes the transport unit 17 to transport the medium 30 by a predetermined distance after the first forward pass, and by the second forward pass, records the third pattern 41*b* at the position on the one side of the medium 30 and records the fourth pattern 42*b* at the position on the other side of the medium 30. Furthermore, by the first return pass, the fifth pattern 43*a* is recorded at the position on the other side of the medium 30, the sixth pattern 44*a* is recorded at the position on the one side of the medium 30, and after the transport unit 17 is caused to transport the medium 30 by the predetermined distance after the first return pass, by the second return pass, the seventh pattern 43*b* is recorded at the position on the other side of the medium 30, and the eighth pattern 44*b* is recorded at the position on the one side of the medium 30. Then, based on the recording result of the first pattern 41*a* to the eighth pattern 44*b*, the information representing the magnitude relationship between the feed amount on the one side of the medium 30 and the feed amount on the other side is acquired.

According to the configuration described above, by recording the test pattern 40 including the first pattern 41*a* to the eighth pattern 44*b* on the medium 30, the control unit 11 can acquire the skew information representing the magnitude relationship from the recording result, and determine which of the forward pass and the return pass to perform in the first recording control.

The present exemplary embodiment discloses, not only a device or a system, but also disclosures of a variety of categories such as a method performed by a device or a system, and the program 12 that causes a processor to perform a method.

For example, it is possible to grasp a recording method by the recording device 10 including the recording head 19 including the nozzle row in which the plurality of nozzles 20 that discharge liquid onto the medium 30 are aligned, the carriage 18 mounted with the recording head 19, and performing the reciprocating movement along the main scanning direction D1, and the transport unit 17 transporting the medium 30 in the transport direction D2 intersecting the main scanning direction D1. In this case, the recording device 10 can perform the forward pass for causing the recording head 19 to discharge the liquid along with the forward movement, which is the movement from the one side to the other side in the main scanning direction D1 by the carriage 18, and the return pass for causing the recording head 19 to discharge the liquid along with the return movement, which is the movement from the other side to the one side by the carriage 18, and the recording method includes a recording step for recording an image by discharging liquid onto the medium 30 based on image data. Then, in the recording step, when the feed amount on the one side of the medium 30 in accordance with the transport is less than the feed amount on the other side of the medium 30, the image is recorded by the forward pass, and when the feed amount on the other side of the medium 30 in accordance with the transport is less than the feed amount on the one side of the medium 30, the image is recorded by the return pass. According to FIG. 7, step S230 corresponds to the recording step described above.

Note that the test pattern for acquiring the skew information of the medium 30 from the recording result is not limited to the specific example illustrated in FIG. 5 and the like. In step S100, it is sufficient that the control unit 11 records, on the medium 30, a test pattern with a configuration such that the skew information can be acquired by evaluating and analyzing the recording results.

In addition, the skew information may be stored in the storage unit 15 when the recording device 10 is shipped by a manufacturer. That is, in advance of the product shipment, how the medium 30 is skew in the transport by the transport unit 17 is evaluated for each product, and evaluation results are stored in the storage unit 15 as skew information. Then, in step S220, the pass direction determination unit 12*b* may determine which of the forward pass and the return pass to select as a pass direction to be adopted for the banding reduction mode, according to the skew information stored in the storage unit 15.

6. MODIFIED EXAMPLES

Modified examples included in the present exemplary embodiment will be described. Combinations of the modified examples are also included within the scope of the present exemplary embodiment.

First Modified Example

The control unit 11 may perform the first recording control for a first region 51, of an image represented by image data, in which banding generated at a boundary portion between bands being units of recording by a forward pass or a return pass, is more noticeable than a predetermined reference, and perform second recording control for a second region 52 other than the first region 51, of the image represented by the image data, in which recording is performed by the forward pass and the return pass. The image data referred to here is the target image data described above. Further, the second recording control is a bi-directional recording.

Figure 8:
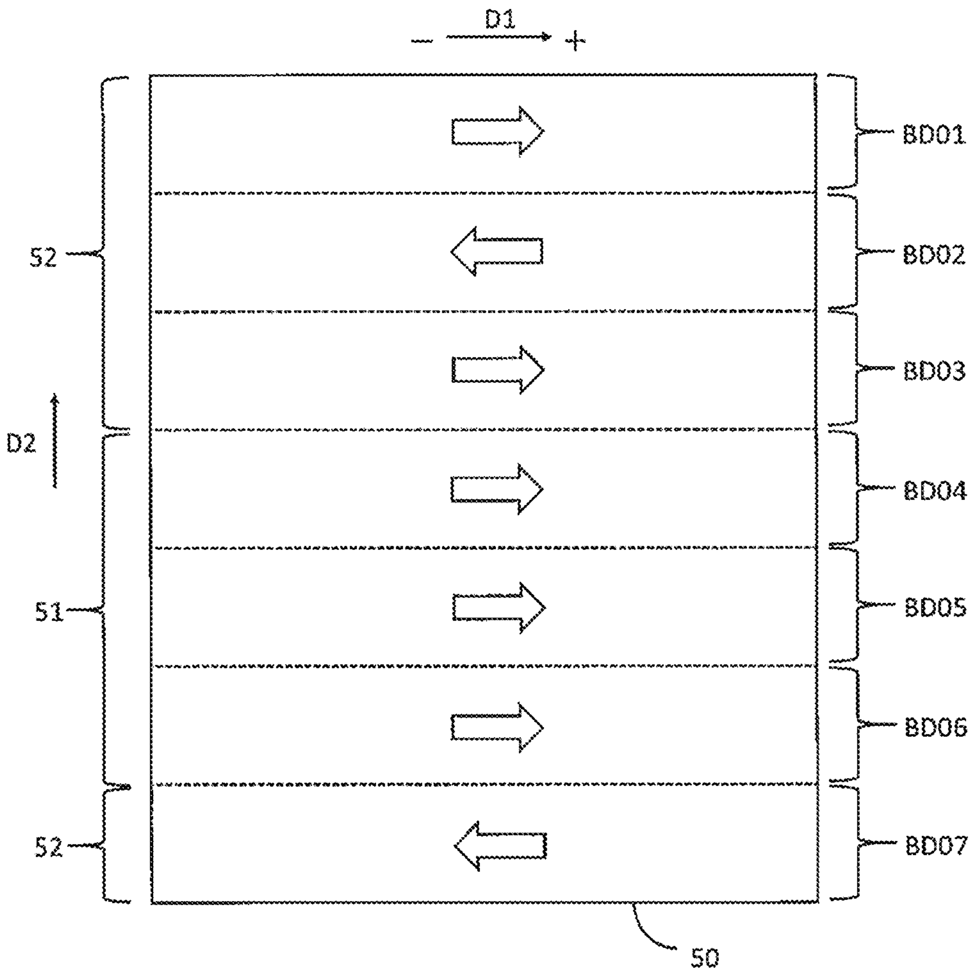
FIG. 8 is a diagram illustrating an example of target image data.

FIG. 8 illustrates target image data 50 for one page. In FIG. 8, a correspondence relationship between an orientation of the target image data 50 and the directions D1 and D2 is also illustrated. Note that, contents of an image represented by the target image data 50 is not illustrated. In the first modified example, the control unit 11 performs step S220, omitting steps S200 and S210 in the flowchart of FIG. 7, and performs the following processing in step S230. Alternatively, in the flowchart of FIG. 7, the following processing is performed in step S230 through steps S200 to S220.

The recording control unit 12*c* first divides the target image data 50 into a plurality of bands. A band width is predetermined from a length of the nozzle row in the transport direction D2 in the recording head 19, and the like. In the example illustrated in FIG. 8, regions that are long in the main scanning direction D1 partitioned by dashed lines in the target image data 50 are bands BD01, BD02, BD03, BD04, BD05, BD06, and BD07.

Next, the recording control unit 12*c* determines, for each of the bands BD01, BD02, BD03, BD04, BD05, BD06, and BDO7 in the target image data 50, which of the first region 51 and the second region 52 the band belongs to. It is sufficient that the recording control unit 12*c* sets a region that does not include a blank therein or a ratio of blanks therein is equal or less than a predetermined ratio to the first region 51, and sets a region that does not correspond to the first region 51 to the second region 52. In the example illustrated in FIG. 8, it is assumed that the recording control unit 12*c* determines the bands BD01, BD02, BD03, and BDO7 as the second regions 52, and determines the bands BD04, BD05, and BDO6 as the first regions 51.

According to the determination, the recording control unit 12*c* controls the carriage 18, the recording head 19, and the transport unit 17, performs the first recording control for a recording of the band corresponding to the first region 51 on the medium 30, and performs the second recording control for a recording of the band corresponding to the second region 52 on the medium 30. That is, as illustrated in FIG. 8, the recording of the bands BD01, BD02, and BD03, which are the second regions 52, is performed in the bi-directional recording, such as in the forward pass, the return pass, and the forward pass. Following the forward pass of the band BD03, the recording of the bands BD04, BD05, and BD06, which are the first regions 51, is performed in a single directional recording. Here, it is assumed that, in step S220, the pass direction determination unit 12*b* determines a pass direction to adopt in the banding reduction mode to the forward pass. Thus, the recording control unit 12*c* performs recording in the forward pass for all of the bands BD04, BD05, and BD06.

A time required for the bi-directional recording for the three consecutive bands BD01, BD02, and BDO3 is shorter because the number of movements of the carriage 18 is small, compared to a time required for the single directional recording for the similar three consecutive bands BD04, BD05, and BD06. It is sufficient that the recording control unit 12*c* performs the recording of the band BD07, which is the second region 52 following the forward pass of the band BD06, by the return pass which is reverse to the pass direction of the previous band BD06.

According to such a first modified example, of the image for the one page, the first recording control is performed only in the first region 51 in which a reduction in recording quality due to banding is easily noticeable, and the bidirectional recording is performed for the second region 52. Therefore, it is possible to suppress a reduction in recording efficiency while effectively suppressing a reduction in recording quality due to banding.

Second Modified Example

The control unit 11 may adjust acceleration or velocity of the movement of the carriage 18 in the first recording control according to the difference between the feed amount on the one side of the medium 30 and the feed amount on the other side of the medium 30. With respect to the second modified example, FIG. 3B and FIG. 3C will be described. A way of looking at FIGS. 3B and 3C is the same as that for FIG. 3A.

FIG. 3B illustrates a portion of the medium 30, and a band BD2 recorded on the medium 30 by one forward pass. When the band BD2 is compared to the band BD1 in FIG. 3A, the acceleration interval T1 of the carriage 18 is longer for the band BD2. In other words, for the band BD2, a time to reach the velocity V1 from velocity 0 before a start of a forward pass is longer, as compared to the band BD1, and thus acceleration of the carriage 18 in the acceleration interval T1 is less than when the band BD1 is recorded. According to such a band BD2, of sides of the band, a side that is inclined with respect to a traveling direction of the carriage 18 (hereinafter, an inclination portion 35) is longer due to a change in band width corresponding to the acceleration interval T1. Therefore, it can be said that an effect of reducing an area of an overlapping portion of bands, in other words, a black line, due to the skew of the medium 30, is higher. In FIGS. 3B and 3C, the inclination portion 35 is indicated by a two-dot chain line for ease of understanding.

FIG. 3C illustrates a portion of the medium 30, and a band BD3 recorded on the medium 30 by one forward pass. The band BD3 is similar to the band BD2 in that the acceleration interval T1 of the carriage 18 is longer as compared to the band BD1. Furthermore, velocity V2 of the carriage 18 in the constant velocity interval T2 of the band BD3 is less than the velocity V1 in the constant velocity interval T2 of the band BD1 or the band BD2. Therefore, a band width H3 of the constant velocity interval T2 and the deceleration interval T3 of the band BD3 is less than a band width H2 of the constant velocity interval T2 and the deceleration interval T3 of the band BD1 and the band BD2. That is, the band width H1<the band width H3<the band width H2. According to such a band BD3, the inclination of the inclination portion 35 can be further reduced, as compared to the band BD2. Therefore, when the skew of the medium 30 is small, banding can be effectively reduced in accordance with such a small skew.

The skew information acquired by the control unit 11 in step S110 may include information indicating a difference between a feed amount on the one side and a feed amount on the other side in the main scanning direction D1, or a degree of skew, in addition to the information such as there is a skew toward the one side in the main scanning direction D1, or there is a skew toward the other side described above. The user evaluates the test pattern 40, and selects and inputs the degree of skew from among a predetermined plurality of levels of degrees, or inputs the degree as an angle with respect to the transport direction D2, and the control unit 11 acquires the degree of skew. Alternatively, the control unit 11 may analyze the read image data of the test pattern 40 to acquire a degree of skew toward the one side in the main scanning direction D1, or a degree of skew toward the other side. Then, in step S120, the control unit 11 also stores the information of the degree of skew in the storage unit 15 in addition to the pass direction for the banding reduction mode according to the skew information, and terminates the flowchart of FIG. 4.

Then, in step S230 of FIG. 7, it is sufficient that the recording control unit 12*c* adjusts acceleration and velocity of the movement of the carriage 18 in accordance with the degree of skew stored in the above-described manner, when performing the single directional recording in the pass direction determined in step S220. For example, it is assumed that a length of the acceleration interval T1 of the band BD1 and the velocity V1 of the constant velocity interval T2 illustrated in FIG. 3A are basic setting of the movement of the carriage 18 in the banding reduction mode. Then, when the degree of skew is equal to or greater than a certain reference, and the single directional recording in the determined pass direction is performed, it is sufficient that the recording control unit 12*c* adopts the length of the acceleration interval T1 of the band BD2 illustrated in FIG. 3B as the setting of the movement of the carriage 18, and performs each pass. Conversely, when the degree of skew is relatively small, and the single directional recording in the determined pass direction is performed, the recording control unit 12*c* may adopt the length of the acceleration interval T1 of the band BD3 or the velocity V2 of the constant velocity interval T2 illustrated in FIG. 3C, as the setting of the movement of the carriage 18, and perform each pass. Note that, the control unit 11 can appropriately adjust a distance of a paper feed by the transport unit 17, such that a gap or overlapping between the bands on the medium 30 is suppressed as much as possible, in consideration of the band widths H2 and H3 assumed in accordance with the velocity of the carriage 18.

According to such a second modified example, in addition to the first recording control described above, the acceleration or velocity of the movement of the carriage 18 is adjusted, according to the difference between the feed amount on the one side and the feed amount on the other side in the main scanning direction D1 of the medium 30. As a result, it is possible to reduce the banding in the recording result with more accuracy depending on the degree of skew.

What is claimed is:

1. A recording device, comprising:

a recording head including a nozzle row in which a plurality of nozzles for discharging liquid onto a medium are aligned;

a carriage mounted with the recording head, and configured to perform a reciprocating movement along a main scanning direction;

a transport unit configured to transport the medium in a transport direction intersecting the main scanning direction; and a control unit configured to control the recording head, the carriage, and the transport unit, wherein the control unit is configured to perform a forward pass of the carriage for causing the recording head to discharge the liquid along with a forward movement being a movement from one side to another side in the main scanning direction, and a return pass of the carriage for causing the recording head to discharge the liquid along with a return movement being a movement from the other side to the one side, and performs first recording control when the liquid is discharged onto the medium to record an image based on image data, in which when a feed amount on the one side of the medium in accordance with the transport is less than a feed amount on the other side of the medium, the image is recorded by the forward pass, and when the feed amount on the other side of the medium in accordance with the transport is less than the feed amount on the one side of the medium, the image is recorded by the return pass.

2. The recording device according to claim 1, wherein the control unit is configured to accept a selection of the recording mode from among a plurality of recording modes corresponding to different recording quality, and performs the first recording control when a selection of a predetermined recording mode having relatively high recording quality among the plurality of recording modes is received.

3. The recording device according to claim 1, wherein the control unit performs the first recording control, when an image represented by the image data is a first type of image in which banding generated at a boundary portion between bands being units of recording by the forward pass or the return pass, is more noticeable than a predetermined reference.

4. The recording device according to claim 1, wherein the control unit performs the first recording control for a first region, of an image represented by the image data, in which banding generated at a boundary portion between bands being units of recording by the forward pass or the return pass, is more noticeable than a predetermined reference, and performs second recording control for a second region other than the first region, of the image represented by the image data, in which recording is performed by the forward pass and the return pass.

5. The recording device according to claim 1, wherein the control unit adjusts acceleration or velocity of a movement of the carriage in the first recording control, in accordance with a difference between a feed amount on the one side of the medium and a feed amount on the other side of the medium.

6. The recording device according to claim 1, wherein the control unit records a first pattern at a position on the one side of the medium and records a second pattern at a position on the other side of the medium, by the first forward pass, causes the transport unit to transport the medium by a predetermined distance after the first forward pass, and records a third pattern at a position on the one side of the medium and records a fourth pattern at a position on the other side of the medium, by the second forward pass, additionally, records a fifth pattern at a position on the other side of the medium and records a sixth pattern at a position on the one side of the medium, by the first return pass, causes the transport unit to transport the medium by the predetermined distance after the first return pass, records a seventh pattern at a position on the other side of the medium and records an eighth pattern at a position on the one side of the medium, by the second return pass, and acquires information indicating a magnitude relationship between a feed amount on the one side and a feed amount on the other side of the medium, based on a recording result of the first pattern to the eighth pattern.

7. A recording method by a recording device including a recording head including a nozzle row in which a plurality of nozzles for discharging liquid onto a medium are aligned, a carriage mounted with the recording head, and performing a reciprocating movement along a main scanning direction, and a transport unit transporting the medium in a transport direction intersecting the main scanning direction, the recording device being configured to perform a forward pass of the carriage for causing the recording head to discharge the liquid along with a forward movement being a movement from one side to another side in the main scanning direction, and a return pass of the carriage for causing the recording head to discharge the liquid along with a return movement being a movement from the other side to the one side, the recording method comprising:

a recording step for discharging the liquid onto the medium to record an image based on image data, wherein in the recording step, when a feed amount on the one side of the medium in accordance with the transport is less than a feed amount on the other side of the medium, the image is recorded by the forward pass, and when the feed amount on the other side of the medium in accordance with the transport is less than the feed amount on the one side of the medium, the image is recorded by the return pass.

* * * * *